US006278063B1

(12) United States Patent
Conrad

(10) Patent No.: US 6,278,063 B1
(45) Date of Patent: Aug. 21, 2001

(54) CABLE TIDY

(75) Inventor: Neville S. Conrad, London (GB)

(73) Assignee: First Major Assets Limited, London (GB)

( * ) Notice: Subject to any disclaimer, the term of this patent is extended or adjusted under 35 U.S.C. 154(b) by 0 days.

(21) Appl. No.: 09/371,649

(22) Filed: Aug. 10, 1999

(30) Foreign Application Priority Data

Jan. 6, 1999 (GB) .................................................. 9900226

(51) Int. Cl.[7] .................................................. H02A 3/14
(52) U.S. Cl. .................................................. 174/67; 220/242
(58) Field of Search .................................. 174/67, 53, 57, 174/66; 220/3.8, 242, 241

(56) References Cited

U.S. PATENT DOCUMENTS 2,441,643 * 5/1948 Mickler .............................. 174/67 X
2,880,264 * 3/1959 Ruskin .................................. 174/67
3,686,425 * 8/1972 Zerwes et al. ......................... 174/53
4,063,110 * 12/1977 Glick .................................. 174/67 X
4,702,541 10/1987 Arnold .
4,749,363 6/1988 Luska et al. .
5,067,907 11/1991 Shotey .
5,122,069 * 6/1992 Brownlie et al. .................. 174/53 X
5,245,507 * 9/1993 Ericksen ............................ 174/67 X
5,274,527 12/1993 Retzlaff .
5,596,479 1/1997 Campell et al. .
5,773,757 6/1998 Kenney et al. .

FOREIGN PATENT DOCUMENTS 2620432 11/1977 (DE) .
3534457 4/1987 (DE) .
2698729 6/1994 (FR) .
2318920 5/1998 (GB) .
98/44597 10/1998 (WO) .

* cited by examiner

*Primary Examiner*—Dean A. Reichard
*Assistant Examiner*—Dhiru R. Patel
(74) *Attorney, Agent, or Firm*—Fay, Sharpe, Fagan, Minnich & McKee, LLP

(57) ABSTRACT

An enclosure for housing a multi-way cable connector, includes an accessible interior for connecting appliances to the connector. The enclosure provides separate apertures for input cables and output cables to the associated appliances. The enclosure can be a box with a lid. Associated cables may pass through a recess formed at an edge of the lid. In one embodiment, the enclosure is placed on the floor, and whenever the lid is closed, the enclosure forms a footrest.

21 Claims, 11 Drawing Sheets

FIG. 4
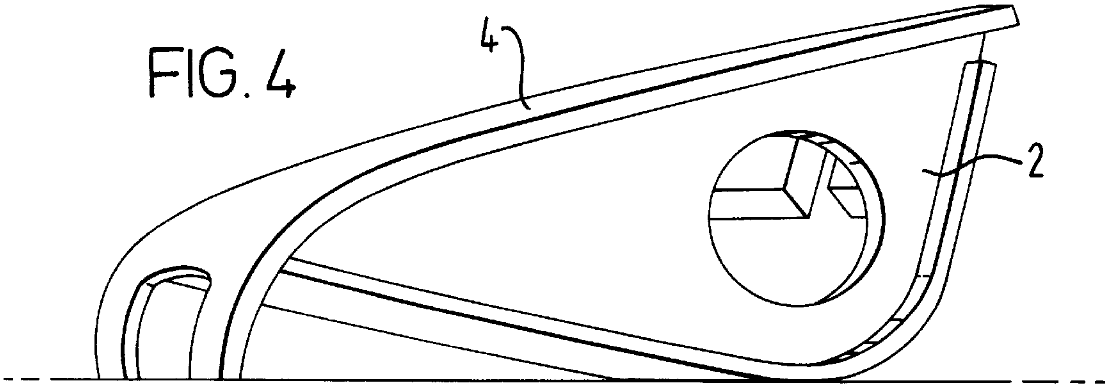
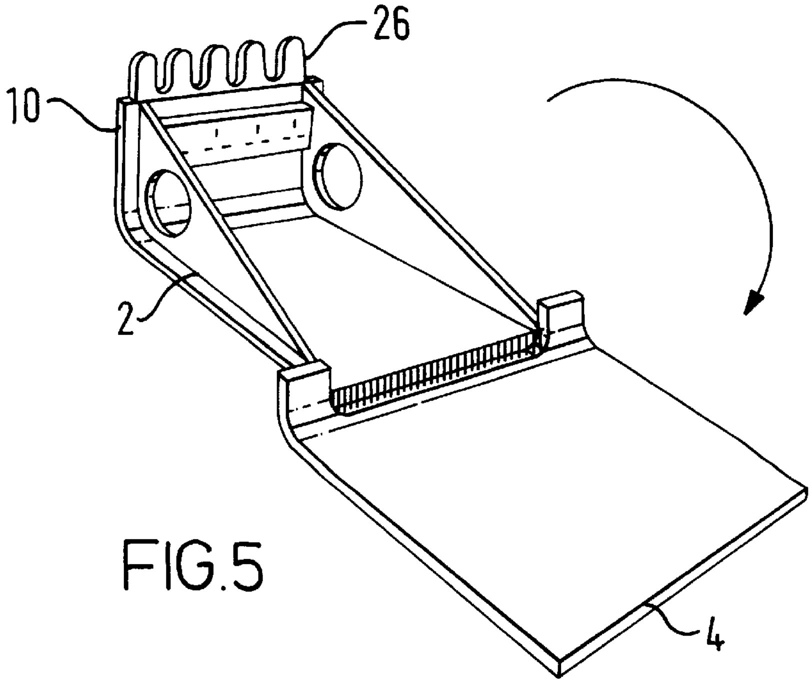
FIG.5

CABLE TIDY

BRIEF SUMMARY OF THE INVENTION

This invention relates to multi-way electrical adaptors, and particularly, although not exclusively, to adaptors for connecting a plurality of appliances having mains plugs, to a single socket outlet.

It may also be usefully applied to other types of "multi-way" adaptors, such as those required to connect a number of telecommunication devices, to a single telephone socket.

In a typical office or home environment, where it is necessary to use such multi-way adaptors because of the large number of electrical and electronic appliances such as computers, TV, Hi Fi, etc which are to be connected to the mains, there typically results an unsightly and possibly dangerous tangle of cables, which is difficult to control. Accordingly, the present invention seeks to provide an arrangement which facilitates the control of such cables, and is very simple to put into effect, without requiring any specialised electrical equipment.

Accordingly, a first aspect of the present invention provides an enclosure adapted to house a multi-way cable connector, including means for accessing the interior of the enclosure to connect appliances to the multi-way connector, exit means for an input cable and for appliance connector cables, and internal storage space for surplus cable.

The exit means for cables may comprise a single aperture or slot, or may comprise separate apertures for the input and output cables.

The enclosure may be adapted to perform additional functions, as well as simply housing the multi-way connector. In addition to the facility for storing surplus cable, the interior may also be adapted to act as a general purpose container or carrying case for portable appliances requiring the use of the multi-way connector themselves, for example, power tools, lap top computers, or other such portable appliances. In such cases, the interior of the enclosure may include recesses or pockets adapted to receive such items and the exterior is preferably provided with a carrying handle.

According to a further feature of the invention, the exterior of the enclosure may be adapted to perform an additional function, for example to act as a foot rest, stool, or small table.

In a preferred form of the invention the enclosure comprises inner and outer shells which are releasably connected by means of "snap-fit" fasteners, for example of the plug and socket type. Preferably, the inner shell is reversible, relative to the outer shell, between a first position in which the assembly is adapted for use in horizontal, floor standing mode (for example as a footrest) and a second position in which it is adapted for use in a vertical, suspended mode (for example attached to the edge of a desk).

Some embodiments of the invention will now be described by way of example, with reference to the accompanying drawings in which:

BRIEF DESCRIPTION OF THE SEVERAL VIEWS OF THE DRAWINGS

FIG. 4 is a perspective view of an enclosure according to a second embodiment of the invention, in a closed condition;

FIG. 5 is a perspective view of the enclosure of FIG. 4 in an open condition;

DETAILED DESCRIPTION OF THE INVENTION

Figure 1:
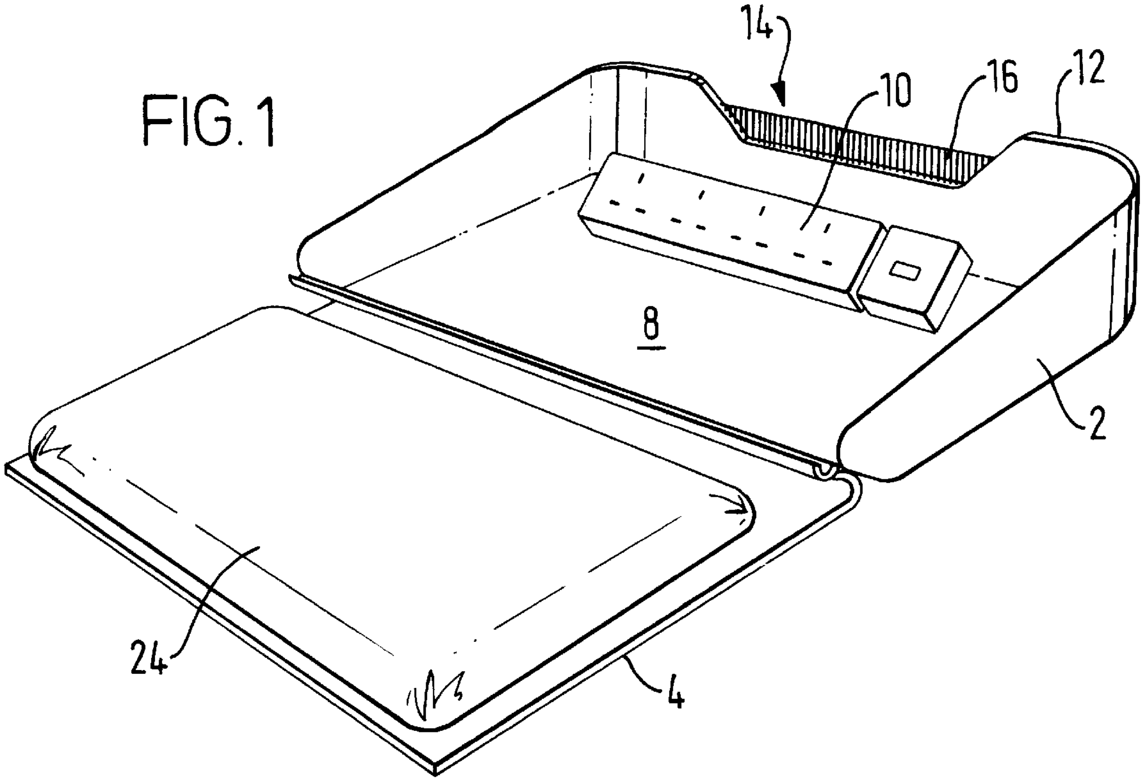
FIG. 1 is a perspective view of a cable enclosure according to a first embodiment of the invention, with the lid in an open condition for access to the interior.
Figure 2:
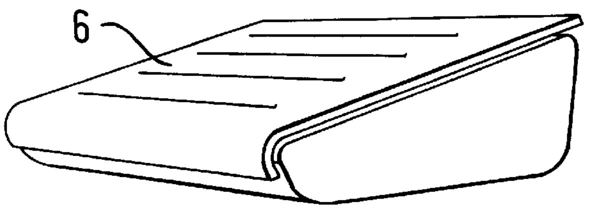
FIG. 2 is a perspective view of the enclosure of FIG. 1 in a closed condition.
Figure 3:
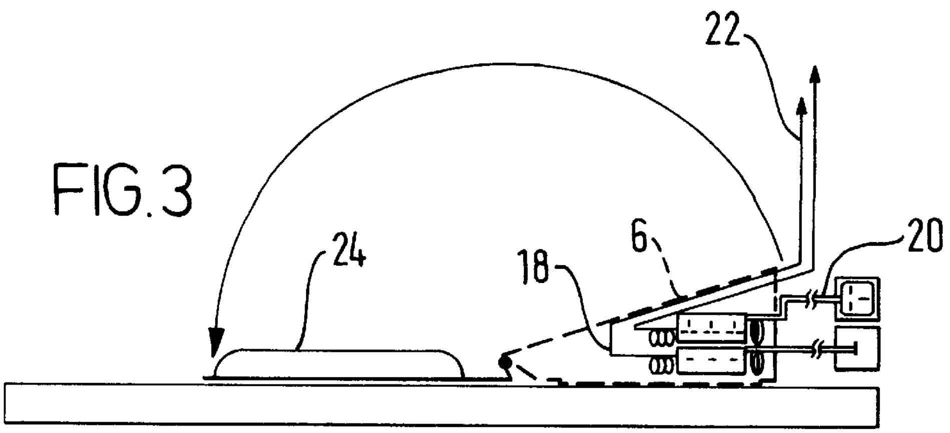
FIG. 3 is a schematic cross-section through the device of FIG. 1, with cables connected to the mains.

Referring to the drawings, FIG. 1 illustrates an enclosure comprising a flat shallow box 2, with a hinged cover 4, which can be opened out flat as illustrated in FIG. 1, to allow access to the interior. As shown in FIGS. 2 and 3, the outer surface 6 of the top of the enclosure takes up a sloped position, when it is closed, so as to form a foot rest, when the device is used in a typical application in an office.

The interior 8 of the enclosure is adapted to house a multi-way mains connector 10, which as shown in FIG. 1, is mounted at a convenient angle for the easy insertion of mains plugs. It may, for example, be held in position by screws or other suitable attachment means such as "hook-and-loop" fasteners, press-studs or the like.

The rear wall 12 of the enclosure is formed with a cut-out, or several cut-outs, so as to leave an opening when the lid 4 is closed, which allows cables to pass in and out of the enclosure in the closed condition, and may be provided with a brush 16 of the "draft excluder" type, in order to partly trap or locate the cabling in that position.

As illustrated in FIG. 3, this allows loose cable 18 to be stored inside the enclosure, with an input lead 20 for connection to the mains, and output leads 22 for connection to equipment, exiting from the rear of the enclosure.

In addition, padding 24 may be provided on the internal surface of the lid 4, to allow a user to kneel on the lid, when inserting or removing mains plugs into or from the multi-way connector 10.

FIGS. 4 and 5 illustrate a second embodiment of the invention, in which the enclosure 2 comprises a tray-like base, enclosing a multi-way connector 10, and in this case a generally comb-like configuration is provided at the rear edge of the base tray to form slots for entry and exit of cables.

Figure 6:
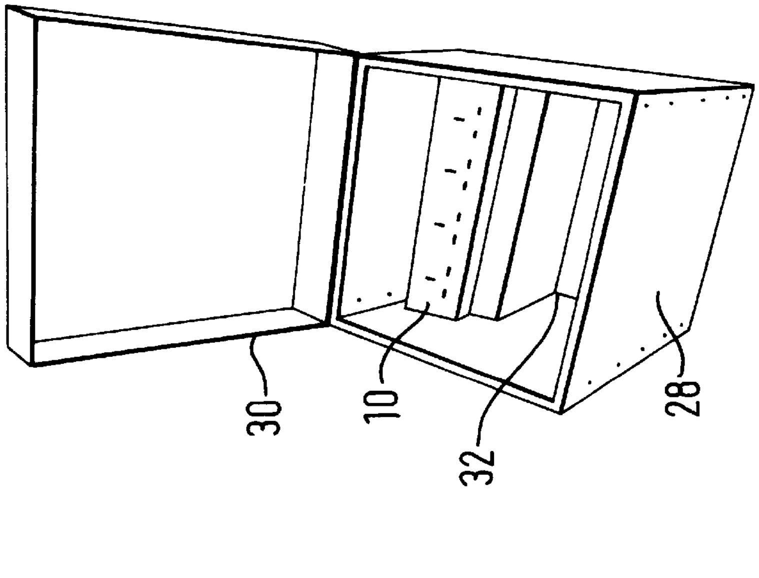
FIG. 6 is a perspective view of a third type of enclosure according to the invention, in an open condition.

FIG. 6 illustrates a generally cube-shaped enclosure 28, having a simple hinged rectangular lid 30, and in this case, the multi-way connector 10 is mounted in the box in a relatively high position, leaving a lower container portion 32, for excess cable or general storage purposes, in the front region of the box.

Figure 8:
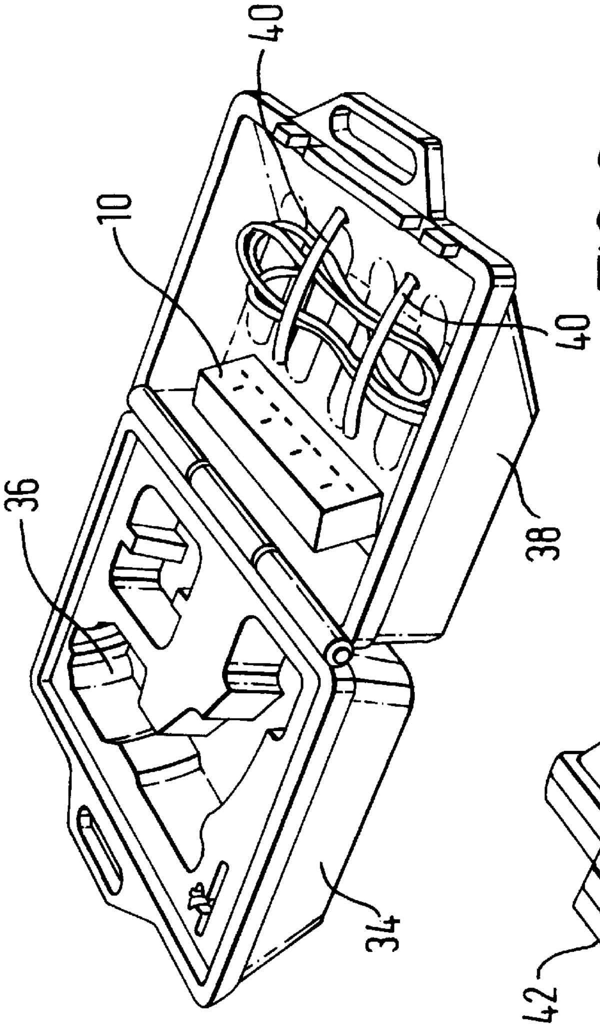
FIG. 8 is a perspective view of the enclosure of FIG. 7 in an open condition.
Figure 7:
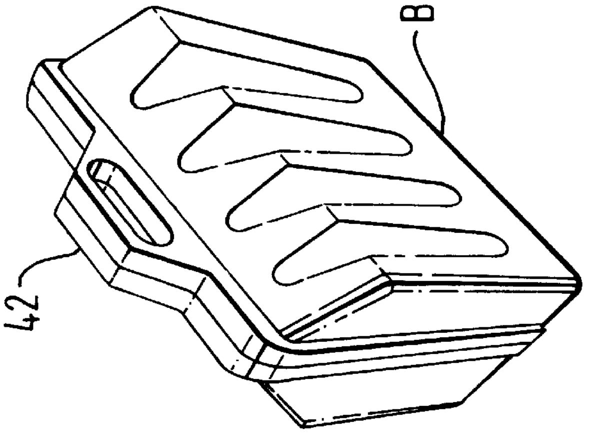
FIG. 7 is a perspective view of a fourth type of enclosure, in a closed condition.

FIGS. 7 and 8 illustrate a further embodiment of the invention, in which the enclosure 34 is made in the form of a "tool box" with one side having shaped recesses 36 to receive a power tool and accessories, and the other side 38 forming a lid which is adapted to receive the multi-way connector 10. The side 38 may also be provided with retaining straps 40 for loose cable or other articles, and the entire assembly closes together, as shown in FIG. 7, to form a carrying case with a handle 42. It will be appreciated that this embodiment is particularly useful for power tools which will in any case require an electrical supply, and for devices such as battery chargers. A similar type of box construction (not shown) can also be used as a "child-proof" container for a multiway connector in combination with known types of child-proof closure devices.

Figure 9:
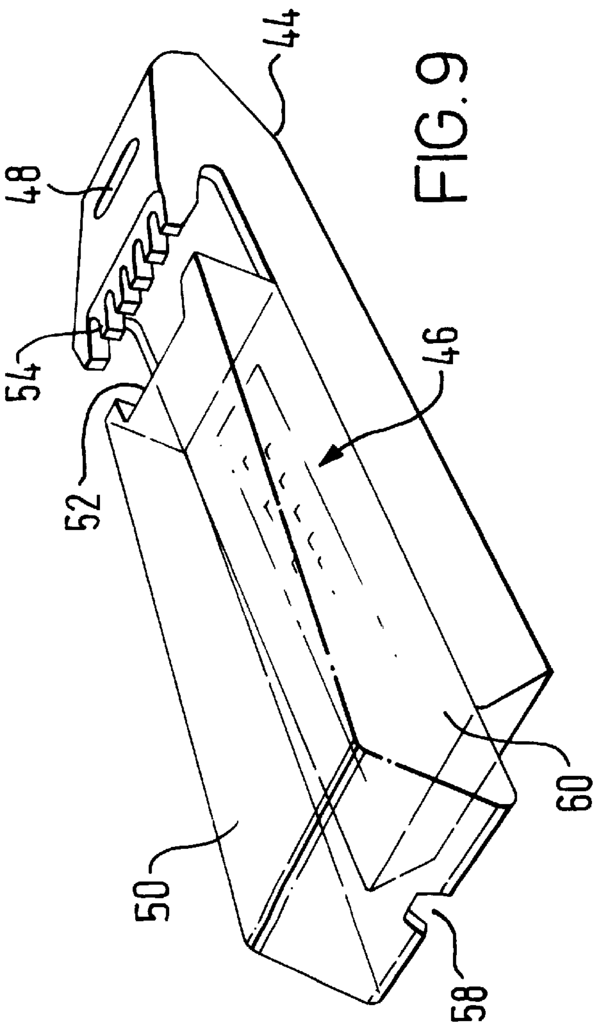
FIG. 9 is a perspective view of a fifth type of enclosure according-to the invention.

FIG. 9 illustrates a further embodiment of the invention, in which the enclosure 44 is combined with display packaging for a multi-way connector 46, and comprises an elongate box having a handle 48 formed at one end, the entire structure being moulded in plastics material (for example). This handle allows the assembly to be hung up for display purposes in a store, as well as for carrying and later storage by the user.

A sliding lid 50, which may be transparent, allows access to the multi-way connector 46 inside, and it will be appreciated that the connector may be fixed in position, for use in conjunction with the housing formed by the enclosure, or may be made removable.

Figure 9A:
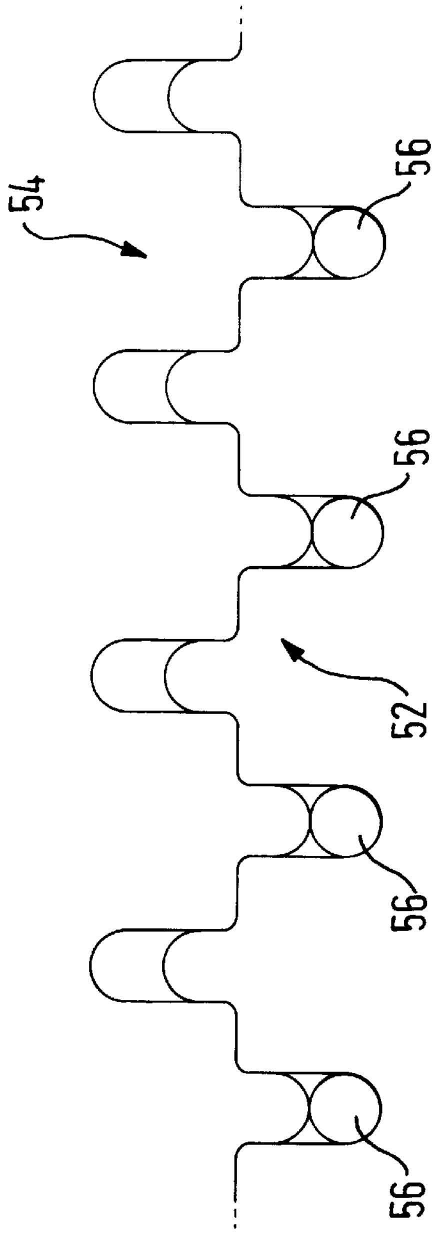

One end 52 of the sliding lid is formed with a "comb-like" edge which cooperates with a corresponding comb-like or castellated edge 54 of the opening of the enclosure, when the lid is in the closed position, so as to form cable retaining slots, as illustrated more clearly in FIG. 9*a*. As can be seen from this FIG., the edges 52 and 54 are formed with cooperating, rounded teeth and slots, which hold exit cables 56 securely in position, when the lid is closed. A further slot in the opposite end of the lid 50 provides an exit point for the connector's own mains lead, which can of course be stored, together with its plug, inside the end region 60 of the housing, in the closed position.

Figure 10:
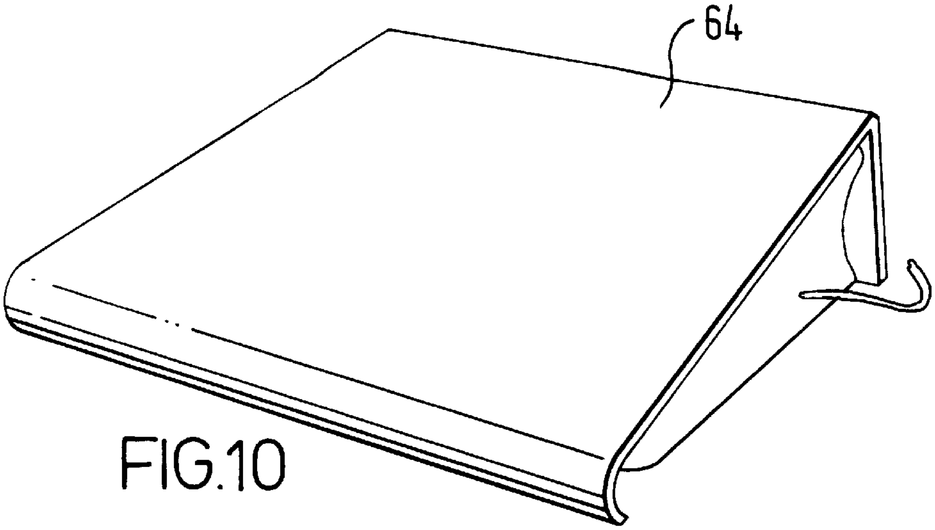
FIG. 10 is a perspective view of a sixth embodiment of the invention, shown in a first working orientation.
Figure 11:
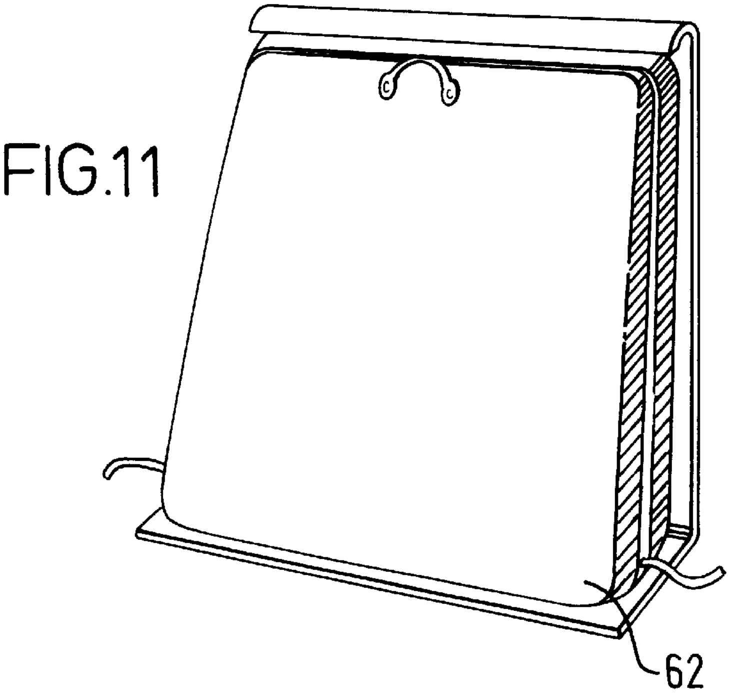
FIG. 11 is a perspective view of the embodiment of FIG. 10, in a second working orientation.

FIGS. 10 and 11 illustrate a further embodiment of the invention, in which the enclosure 62 comprises a flexible bag of fabric material, which is closed by a zip or "hook and loop" fastener e.g. "Velcro" (R.T.M.). A simple folded aluminium shell 64 holds the bag 62 for example by means of "Velcro" (R.T.M.), so that the whole assembly can be used in a laid flat position on the floor, as illustrated in FIG. 10. In this position the shell can be used as a foot rest. Alternatively, it can be used in a vertically standing position, as illustrated in FIG. 11, with the rear end 66 of the aluminium shell forming a base.

Figure 12:
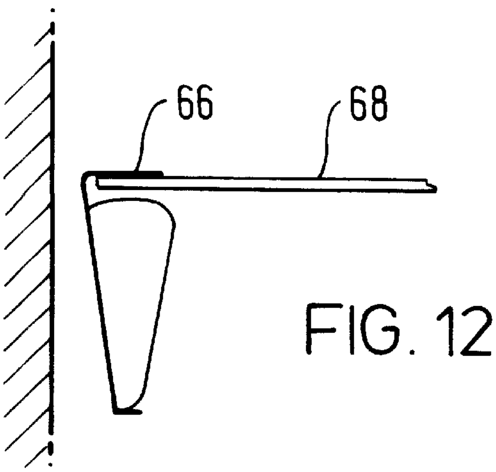
FIG. 12 is a side view of the embodiment of FIG. 10, in a third working orientation.

In addition, if the assembly is required to be kept off the floor, the arrangement may be such that the end 66 can be used as a "hanger", as illustrated in FIG. 12, where the assembly is simply hung on the rear edge of a desk top 68, table or shelf. Preferably the arrangement is also such that the bag can be separated for access or for use separately.

Figure 13:
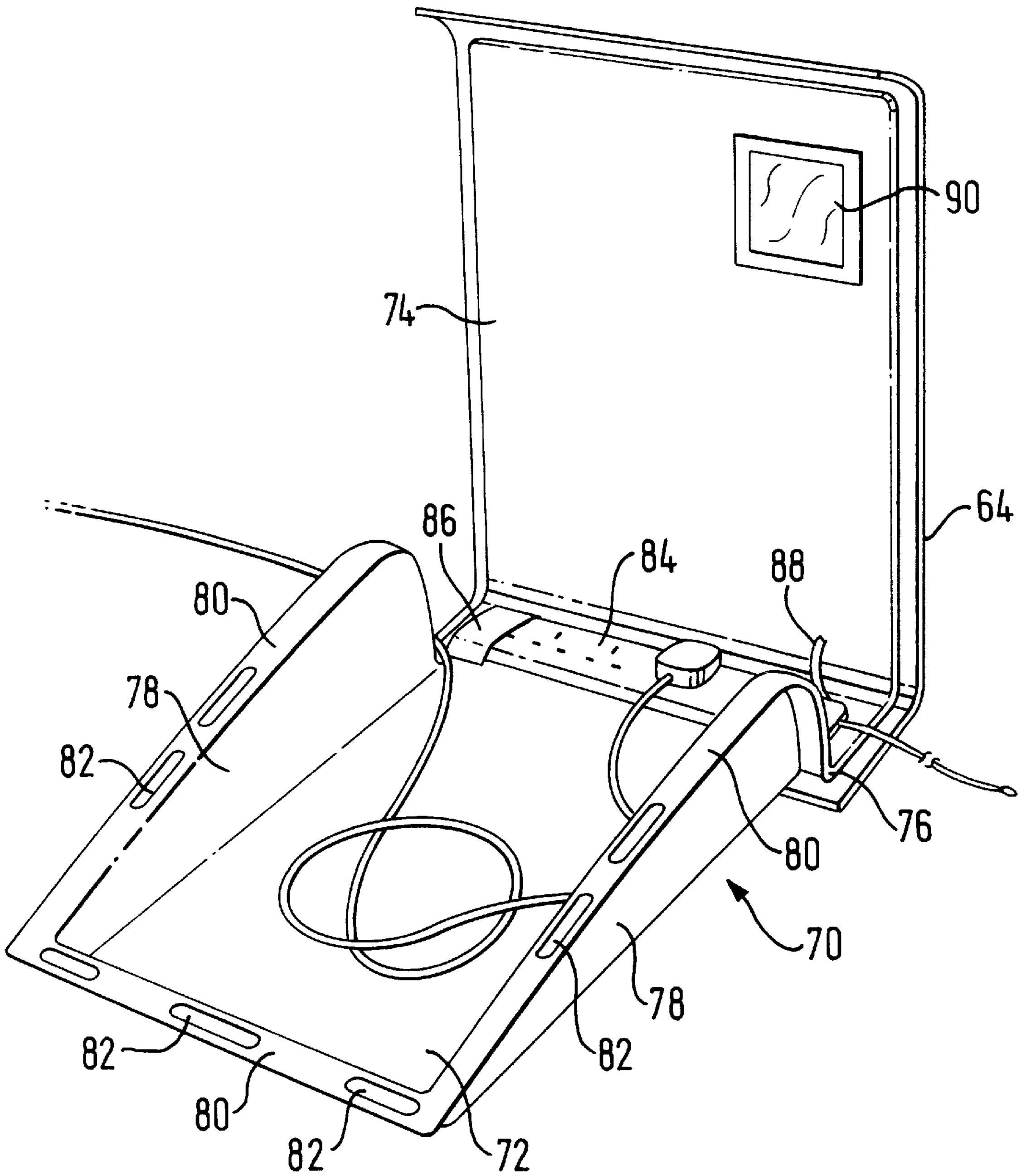
FIG. 13 is a perspective view of a seventh embodiment of the invention, in an open condition.
Figure 14:
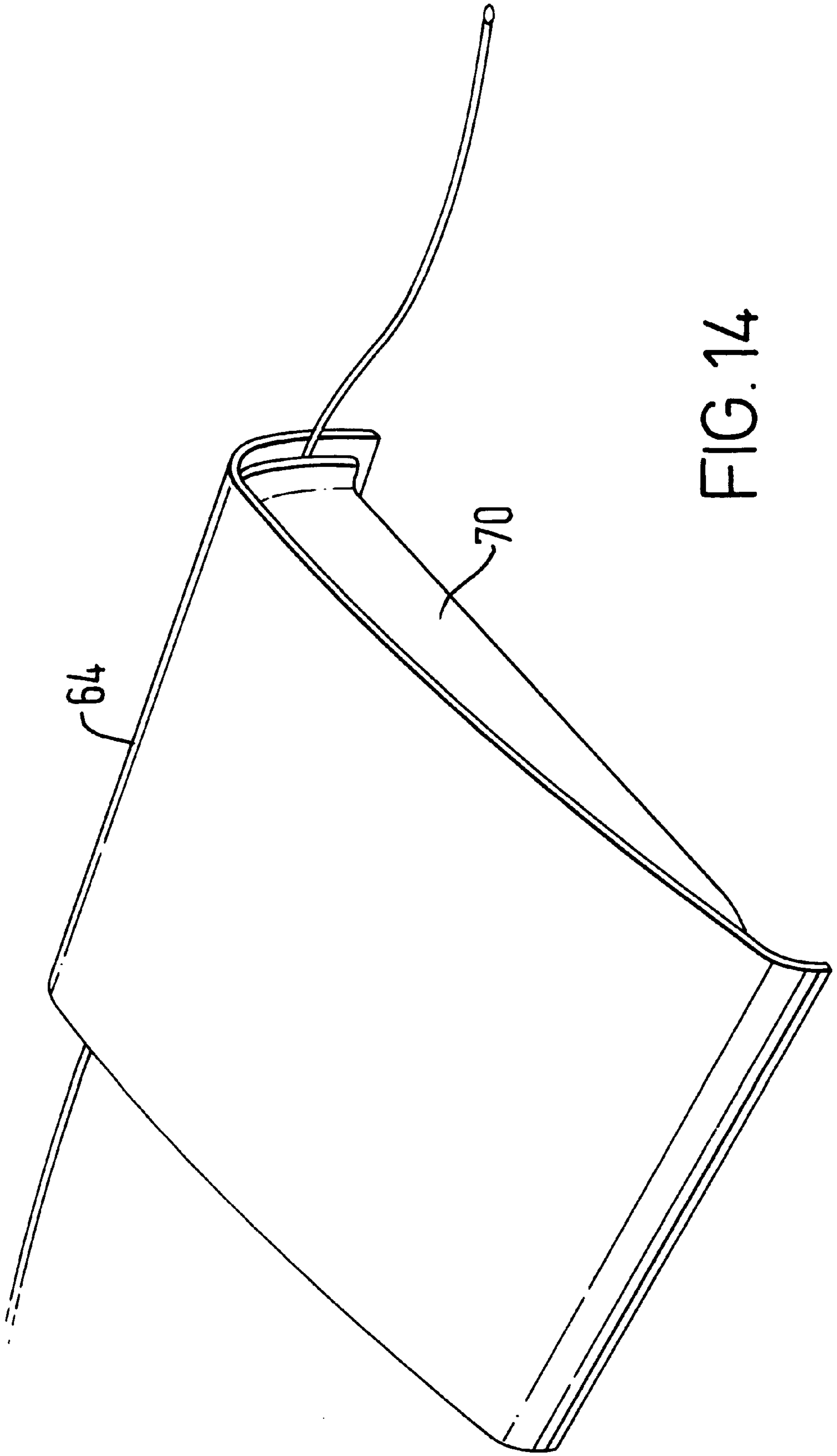
FIG. 14 is a perspective view of the embodiment of FIG. 13 in a working position.
Figure 15:
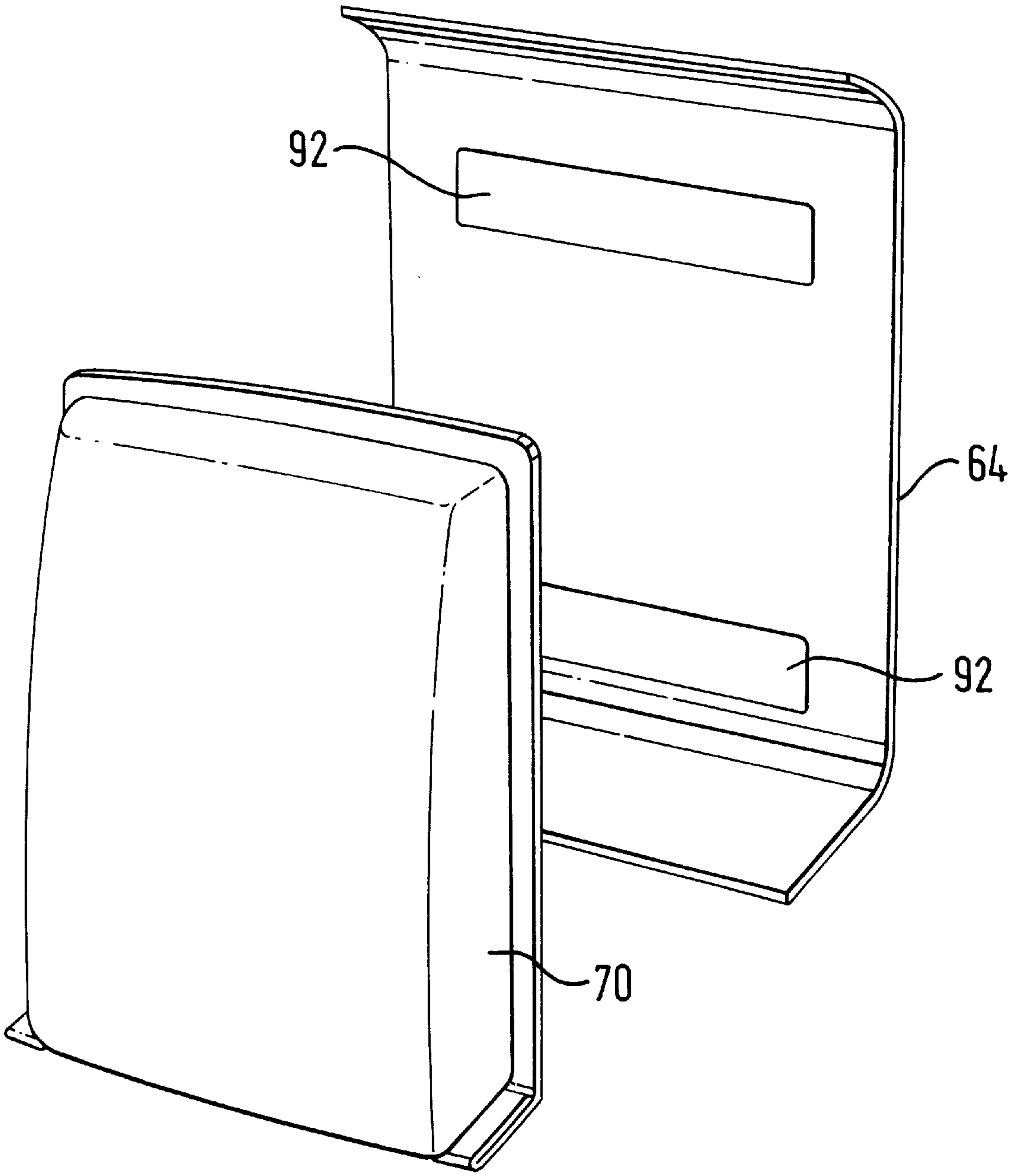
FIG. 15 is a perspective view of the embodiment of FIG. 13 in a partly disassembled condition.

FIGS. 13–15 illustrate another variation of a construction comprising a rigid shell, combined with a flexible or semi-rigid inner bag or housing. The shell 64 in this embodiment is similar to that of FIGS. 10 to 12 and can be used in corresponding working positions, but the inner housing 70 in this case comprises a semi-rigid casing (for example of a rubberised canvas type material) compressing a first tray-like body 72 forming a cable housing and a second, flap-like lid 74, connected together by an integral hinge (e.g. a line hinge) 76.

The body 72 has upstanding side walls 78 and is flanged around its edges as illustrated at 80, so that when the two parts are closed together, the flanges 80 of the body engage with the edges of the inner surface of the lid part 74. As illustrated the inner surface of the part 74 carries one component of a "hook-and-loop" fastening system, with strips 82 of the other component being attached to the surface of the flanges 80, to keep the two parts releasably engaged with one another, and it will be appreciated that this enables cables to be passed between the mating edges in various alternative positions.

In addition, as illustrated in FIG. 13, a location is provided adjacent the hinge 76 for a standard multi-way connector 34, with a retaining device 86 comprising a flexible elasticated "sock" into which the free end of the connector can be inserted. A strap 88 is provided adjacent the other end, which also has a hook-and-loop fastening, so that it can be closed over the connector to hold it in position. In addition a "patch pocket" 90 may be provided inside the lid 74, also retained by the "hook and loop" system, for storing small accessories. As shown in FIG. 15, the enclosure 70 is also held in the shell 64 by hook-and-loop fasteners 92.

Figure 16:
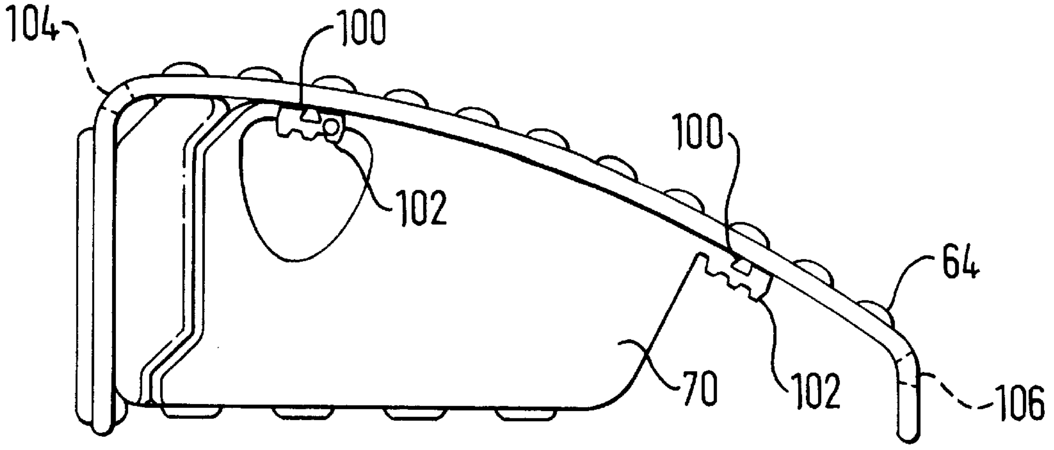
FIG. 16 is a side elevation of an eighth embodiment of the invention.
Figure 17:
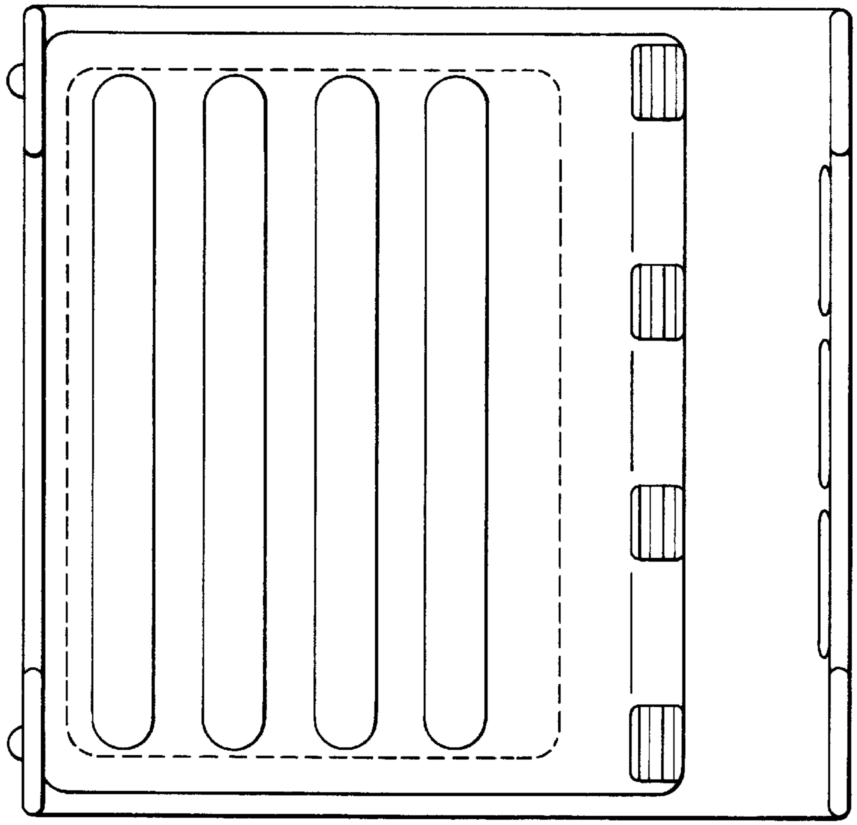
FIG. 17 is an underneath plan view of the embodiment of FIG. 16.
Figure 18:
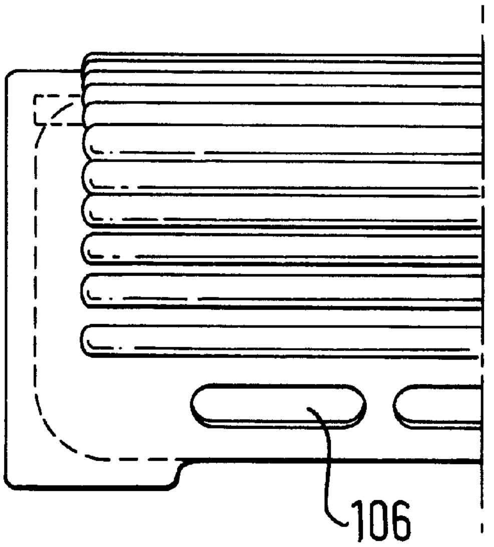
FIG. 18 is a partial front elevation of the embodiment of FIG. 16.
Figure 20:
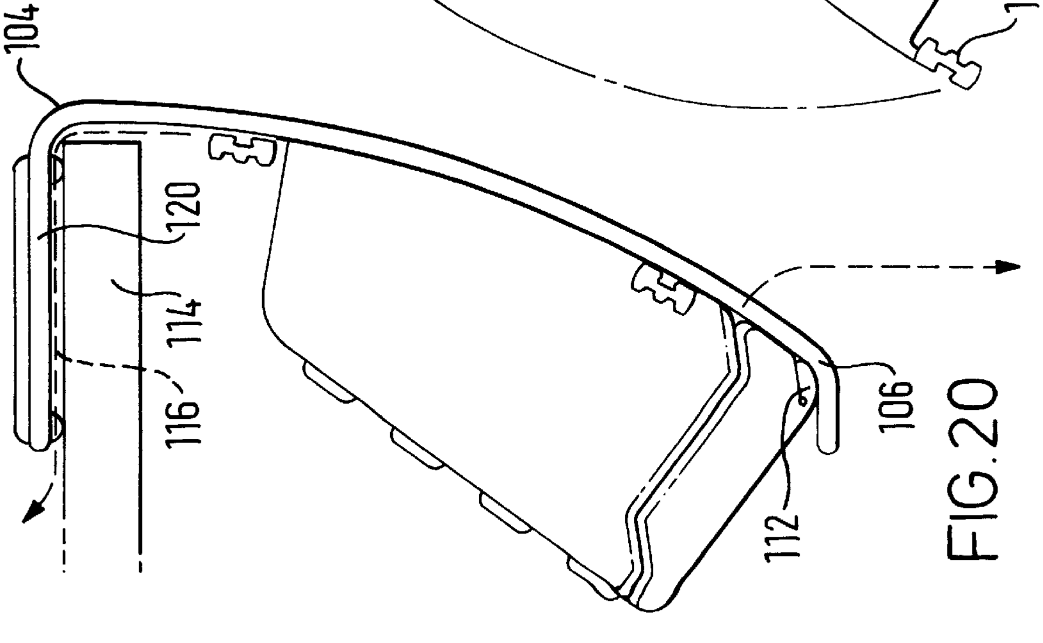
FIG. 20 is a schematic side elevation showing an alternative arrangement of the embodiment of FIG. 16 in a closed condition.

FIG. 16 illustrates a specially adapted dual-purpose version of the invention which can be used either as a footrest with surplus cable storage, or to provide desk mounted cable storage. As in the arrangement of FIGS. 13–15, the device has an outer shell 64 which forms a footrest, and an inner shell 70 which forms a cable housing. When the lid is shut on the body, and the body is positioned on a floor surface, the lid defines an acute angle in relation to the body in order to form a footrest. Such an arrangement is also shown in FIGS. 2, 10 and 14. The inner shell 70 is releasably connected to the edges of the underside of the outer shell 64 by means of mating a "stud and socket" connectors 100, 102 so that it can be opened, the studs 100 projecting from the surface of the outer shell, as can be seen more clearly in the view of FIG. 21. In addition the uppermost edge of the inner shell (as seen in FIG. 16) is provided with snap-fit projections which fit into apertures 104 in the corresponding inner surface of the outer shell, as shown in FIG. 16. However, they can alternatively be fitted, with the shell in a reverse position as shown in FIGS. 20 and 21, into another set of apertures 106 at the other inside edge of the outer shell, as will be explained in more detail below.

Figure 21:
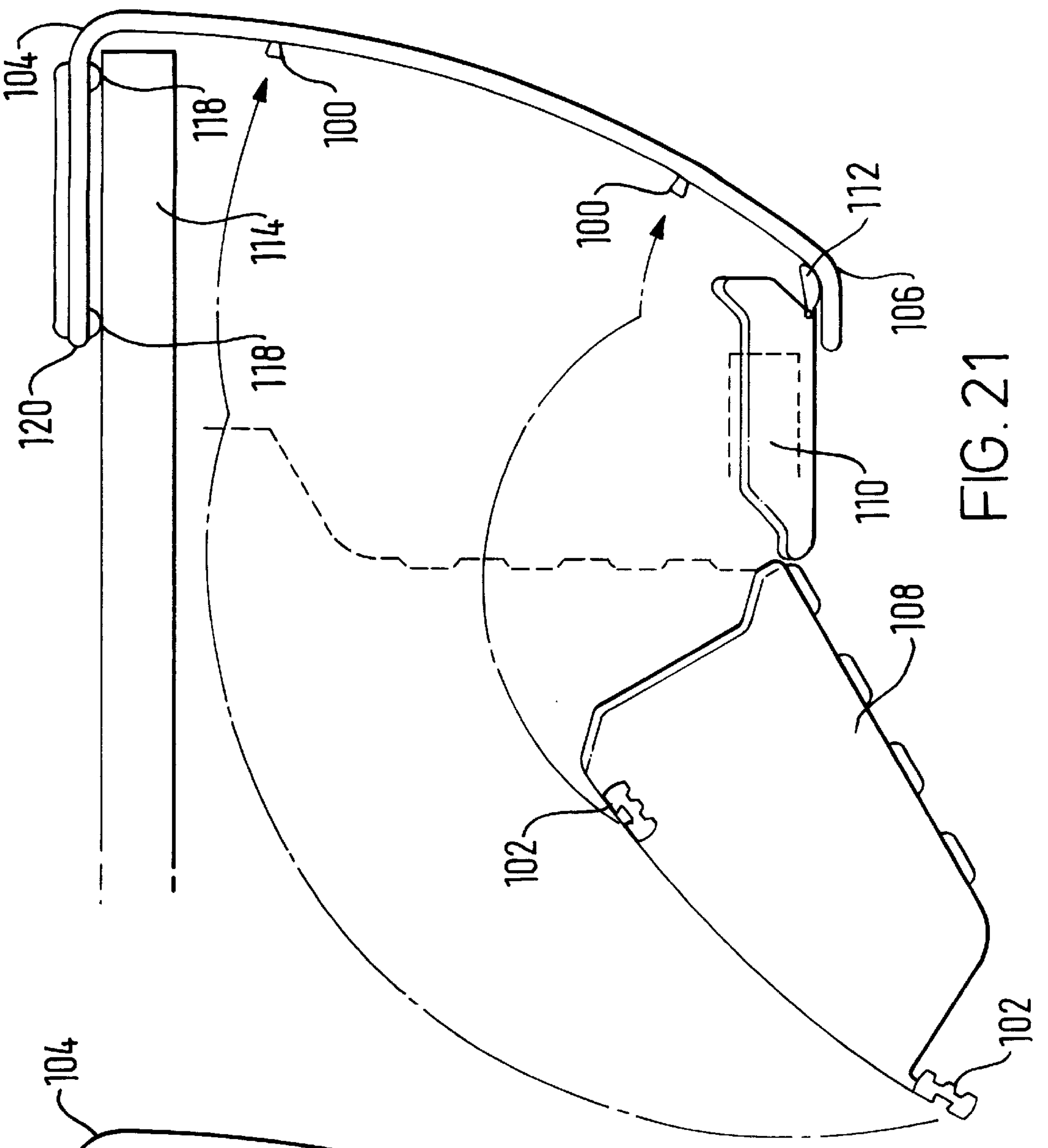
FIG. 21 is a side elevation of the arrangement of FIG. 20, in an open condition.

As best seen in FIG. 21, the inner shell which is preferably moulded from a semi-transparent, rubberised plastic, actually comprises three sections 108, 110 and 112 which are hingedly connected together by their edges. The section 108 comprises the main body forming the "cable dump", and the section 110 forms the housing for the connector block, while the section 112 comprises a narrow flap carrying the snap-fit projections by means of which the inner shell is connected to the outer shell. It will be appreciated from a comparison of FIGS. 16 and 20 that the profiles of the inner and outer shells are such that the inner shell can be fitted either with the projections of the flap 112 engaged in the apertures 104 as in FIG. 16, or in a "reversed" position, as shown in FIGS. 20 and 21, with the flap 112 connected into the apertures 106.

The arrangement of FIG. 16 thus provides a relatively flat underside so that the device can be employed as a footrest. Alternatively, the "reversed" arrangement of FIGS. 20 and 21 shifts the inner shell and thus the centre of gravity in such a way that the assembly can be hung onto the edge of the surface of a desk 114 as shown in FIGS. 20 and 21.

The three-part hinged arrangement then allows the assembly to be opened about its lower edge, as shown in FIG. 21 so that connections can be made to the connector block in section 110 and excess cable can be looped into the section 108, before the assembly is again closed and the connectors 100,102 are re-engaged.

As indicated at 116 in FIG. 20, cables to equipment on the desk-top can be routed through a gap between the assembly and the desk surface which is formed by small suds 118, preferably of flexible rubber material, which are fixed to the inside surface of the rear wall 120 of the outer shell so as to engage the desk surface when the assembly is hung on the edge of the desk.

Figure 19:
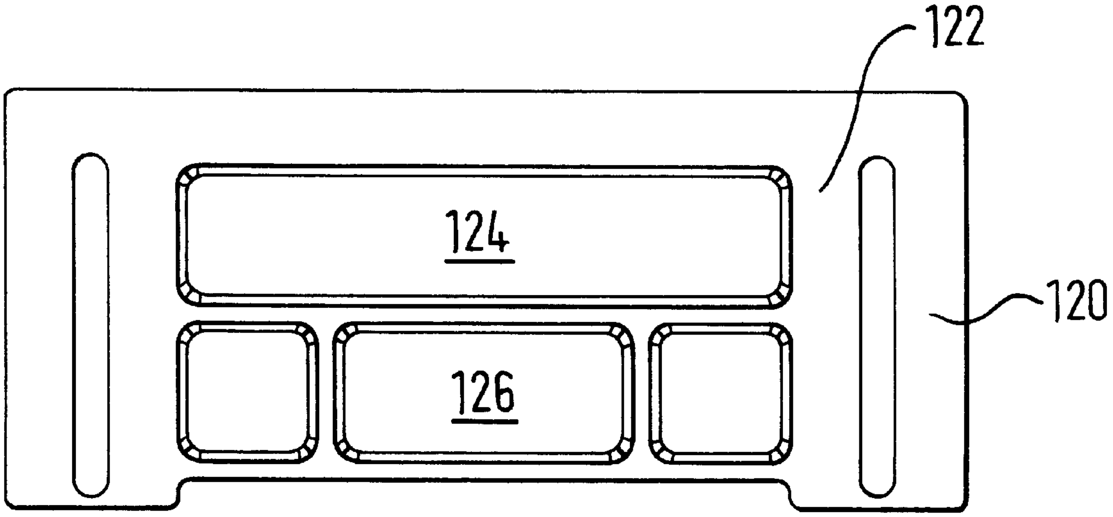
FIG. 19 is a rear elevation of the embodiment of FIG. 16.

In addition, as illustrated in FIG. 19, the outside surface 122 of the rear wall, which is uppermost in the arrangement of FIGS. 20 and 21, may be formed with inset recesses forming trays 124, 126, to receive pens, pencils and the like.

What is claimed is:

1. An enclosure adapted to house a multi-way cable connector, including a body, a lid selectively connected to the body for selectively allowing access to an interior of the enclosure to connect a connector of an associated appliance to the multi-way cable connector, at least a first and a second aperture located in one of the lid and the body for an associated input cable and for associated output cables to the associated appliance, an internal storage space for a surplus of said associated input and output cables and a suspending element formed on one of the lid and the body to allow suspension of the enclosure from an associated support, wherein one of the lid and the body comprises locking apertures and the other of the lid and the body comprises snap fit projections which can extend into the locking apertures to allow the lid to be selectively connected to and disconnected from the body.

2. The enclosure according to claim 1 wherein separate apertures are provided for each of the associated input and output cables.

3. An enclosure according to claim 1 in which the interior of the enclosure is provided with one or more recesses or pockets for portable appliances.

4. The enclosure according to claim 1 in which an exterior portion of the enclosure is adapted to be used as a footrest.

5. The enclosure according to claim 1 in which the lid is hinged, and a cut-away is formed along at least one of a pair of co-operating edges of the lid and the body for associated cables to pass through.

6. The enclosure according to claim 1 in which the lid and the body have co-operating sides or edges which are provided with co-operating toothed formations to hold the associated cables.

7. The enclosure according to claim 1 in which the exterior portion of the enclosure suspending element comprises a carrying handle.

8. The enclosure according to claim 1 in which the lid and the body have co-operating edges which are provided with brushes to hold the associated cables.

9. The enclosure according to claim 1 in which the lid is slidably amounted on the body.

10. An enclosure adapted to house a multi-way cable connector, including means for accessing the interior of the enclosure to connect appliances to the connector, exit means for an input cable and for output cables to the appliances, and internal storage space for surplus cable, the enclosure comprising a rigid outer shell having at least one open side, and a flexible or semi-rigid inner shell which co-operates with the open side of the outer shell.

11. An enclosure according to claim 10 in which the inner shell comprises two parts which are hinged together, having co-operating closure means at their adjacent edges and also comprise releasable connection means for attachment to the outer shell.

12. An enclosure according to claim 10 which the inner and outer shells are interconnected by co-operating stud and socket fasteners.

13. An enclosure according to claim 10 in which the position of the inner shell is reversible, relative to the outer shell, between a first position in which the enclosure is adapted for use in a horizontal, floor-standing mode and a second position in which it is adapted for use in a vertical, suspended mode.

14. An enclosure according to claim 10, in which the position of the inner shell is reversible, relative to the outer shell, between a first position in which the enclosure is adapted for use in a horizontal, floor-standing mode and a second position in which it is adapted for use in a vertical, suspended mode, the second position of the inner shell being such that it is spaced apart from one wall of the outer shell, forming a recess which is adapted to fit onto the edge of a desk-top.

15. An enclosure according to claim 10 in which the position of the inner shell is reversible, relative to the outer shell, between a first position in which the enclosure is adapted for use in a horizontal, floor-standing mode and a second position in which it is adapted for use in a vertical, suspended mode, the inner shell comprising at least two sections, a first one of the sections being adapted to form a releasable, hinged connection to the outer shell, whereby the other section or sections can be opened for access to the interior of the enclosure.

16. An enclosure according to claim 10 in which the the position of the inner shell is reversible, relative to the outer shell, between a first position in which the enclosure is adapted for use in a horizontal, floor-standing mode and a second position in which it is adapted for use in a vertical, suspended mode, the inner shell comprising three sections, the second and third sections forming compartments for cable storage and for a multi-way connector, respectively.

17. An enclosure adapted to house a multi-way cable connector, comprising:

a body;

a lid mounted on said body to allow selective access to an interior portion of the enclosure to connect associated appliances to the connector;

at least a first and a second aperture located in one of the lid and the body for an associated input cable and for associated output cables to said associated appliances;

an internal storage space for surplus of said associated input and output cables; and wherein when said lid is shut on said body and a bottom face of said body is positioned parallel to a subjacent support surface, said lid defines an acute angle in relation to said body bottom face in order to form a footrest.

18. The enclosure according to claim 17 in which a cut-away is formed along at least one of a pair of co-operating edges of the lid and the body for said associated cables to pass through.

19. The enclosure according to claim 17 in which the lid and the body have co-operating edges which are provided with co-operating toothed formations to frictionally retain the associated cables.

20. The enclosure according to claim 17 in which the lid and the body have co-operating edges which are provided with brushes formed to frictionally retain the asssociates cables.

21. An enclosure adapted to house a multi-way cable connector, comprising:

a first member;

a second member, wherein one of the first and second members comprises apertures and another of the first and second members comprises snap fit projections which can extend into the apertures to allow the first and second members to be selectively connected to and disconnected from each other;

exit means defined in at least one of the first and second members for an associated input cable and for associated output cables to associated appliances;

an internal storage space defined in the enclosure for a surplus of said associated input and output cables, wherein access is provided to the internal storage space when the first and second members are at least partially disconnected from each other; and a handle formed on an exterior of the enclosure for suspending the enclosure from an associated support.

* * * * *